US010879754B2

(12) United States Patent
Yao et al.

(10) Patent No.: US 10,879,754 B2
(45) Date of Patent: Dec. 29, 2020

(54) AXIAL FLUX MOTOR HAVING AN INSULATED ROTOR

(71) Applicant: GM Global Technology Operations LLC, Detroit, MI (US)

(72) Inventors: Jian Yao, Shanghai (CN); Chengwu Duan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 16/426,807

(22) Filed: May 30, 2019

(65) Prior Publication Data

US 2020/0251946 A1 Aug. 6, 2020

(30) Foreign Application Priority Data

Feb. 2, 2019 (CN) .......................... 2019 1 0107014

(51) Int. Cl.
*H02K 21/12* (2006.01)
*H02K 1/27* (2006.01)
*H02K 21/24* (2006.01)
*H02K 1/28* (2006.01)

(52) U.S. Cl.
CPC ............. *H02K 1/2793* (2013.01); *H02K 1/28* (2013.01); *H02K 21/24* (2013.01)

(58) Field of Classification Search
CPC .................................................... H02K 1/2793
USPC ..................................................... 310/156.32
See application file for complete search history.

(56) References Cited

U.S. PATENT DOCUMENTS

| 5,619,087 | A | * | 4/1997 | Sakai | ........................ | H02K 1/12 310/156.36 |
| 6,664,689 | B2 | * | 12/2003 | Rose | ...................... | H02K 21/12 310/156.32 |
| 8,659,199 | B2 | * | 2/2014 | Tokoi | ...................... | H02K 15/03 310/156.12 |
| 2008/0100174 | A1 | * | 5/2008 | Stahlhut | ................... | H02K 1/20 310/268 |
| 2010/0072850 | A1 | * | 3/2010 | Miyata | .................... | H02K 21/24 310/156.12 |
| 2010/0277025 | A1 | * | 11/2010 | Doi | ......................... | H02K 21/24 310/156.12 |
| 2011/0080065 | A1 | * | 4/2011 | Watanabe | ............ | H02K 1/2793 310/156.32 |
| 2011/0148224 | A1 | * | 6/2011 | Tokoi | ................... | H02K 1/2793 310/43 |

* cited by examiner

*Primary Examiner* — Alexander Talpalatski

(57) ABSTRACT

An axial flux motor having a stator and a rotor disposed about a rotational axis adjacent the stator defining an air gap therebetween. The rotor includes a disk having an interior face oriented toward the stator and an opposite exterior face; a plurality of magnets affixed in a predetermined arrangement on the interior face of the disk; a back plate abutting the exterior face of the disk, and a segmented cage fitted onto the interior face. The back plate includes a circumferential edge surface defining a plurality of notches. The segmented cage includes a plurality of retainer ribs configured to retain the magnets in the predetermined arrangement on the interior face of the disk. The segmented cage cooperates with the back plate to structurally support the disk therebetween, thereby inhibiting the disk from flexing in an axial direction.

20 Claims, 2 Drawing Sheets

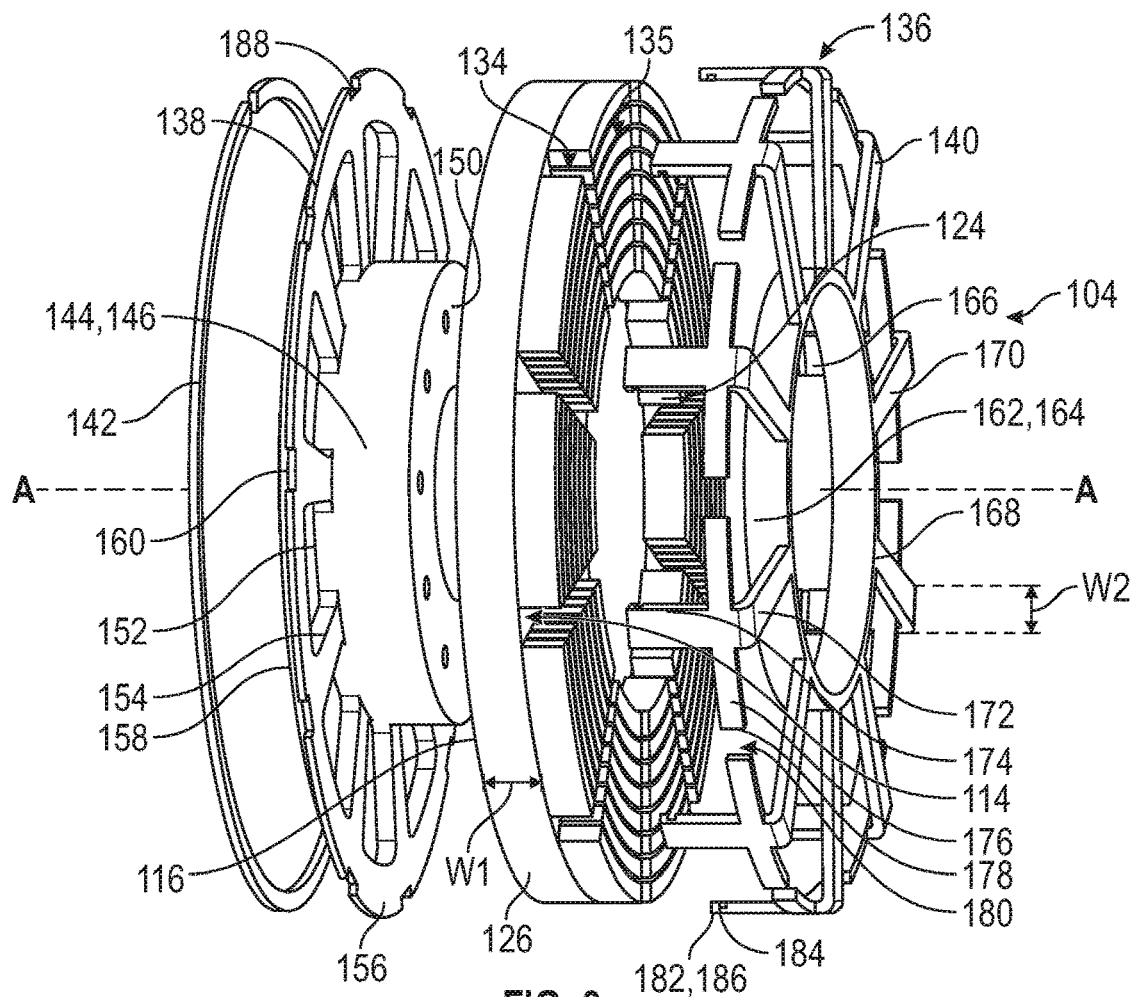
FIG. 3
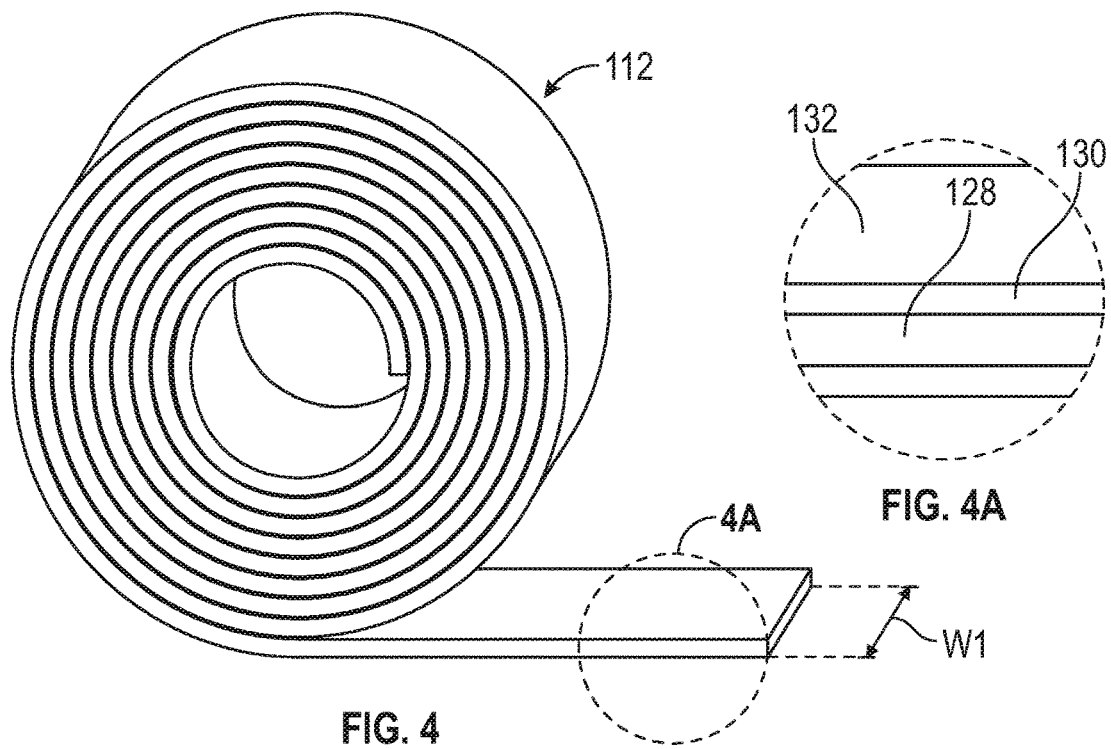
FIG. 4
FIG. 4A

AXIAL FLUX MOTOR HAVING AN INSULATED ROTOR

The present disclosure relates axial flux motors; more specifically to an axial flux motor having an electrically insulated rotor.

Electric motors utilize the principle of electromagnetic interactions of magnetic fields generated by coils and magnets to transform electrical energy into mechanical energy. Electric motors typically include a stationary component, known as a stator, and a rotary component, known as a rotor. The rotor is separated from the stator by a small air gap and rotates relative to the fixed stator. An output shaft may be coupled to the rotor to transmit the rotational mechanical energy for beneficial use.

Depending on the relative position of the rotor to the stator, the electric motor may be classified as a radial flux motor or an axial flux motor. In a radial flux motor, the magnetic flux generated by the interaction of energized stator and rotor extends radial to the output shaft. In an axial flux motor, the magnetic flux extends parallel to the output shaft. In certain application, axial flux motors are desirable due to its relative lightweight, increased power, and compact size as compared to radial flux motors. The rotor and stator of a radial flux motor are typically stacked on a common axis. The diameters of the rotor and stator may be expanded to increase the power output of the axial flux motor. Axial flux motors are also referred to as pancake motors because of their overall short length and large diameter as compared to radial flux motors.

The rotor of an axial flux motor includes a disk having an interior face that is oriented toward the stator. A plurality of permanent magnets are circumferentially attached in a predetermined arrangement onto the interior face of the disk with adhesives and mechanical fasteners. For larger diameter axial flux motors used in high torque applications, metallic cages are used to secure the magnets onto the interior face of the disk and the disk is manufactured of a coiled laminated silicon steel strip. Mechanical fasteners, such as metallic pins and bolts, are radially inserted through the laminated disk to increase the strength and bending resistance of the laminated disk.

The use of metallic fasteners and metallic cages are desirable for maintaining the structural integrity of the laminated disk. However, the insulating property of the lamination silicon steel strip may be weaken due to the metallic fasteners piercing through the laminate layers. Also, metallic fasteners and metallic cages tend to react with the magnetic flux to generate major eddy current loops when the axial flux motors are energized, thus increasing eddy current loss in the metallic cages and metallic fasteners and increasing iron loss in the permanent magnets resulting in decreased efficiency.

Thus, while high torque axial flux motors achieve their intended purpose, there is a need for robust metallic fasteners to maintain the structural integrity of the laminated disk and to secure the magnets while minimizing or eliminating major eddy currents generated by the metallic fasteners reaction with the magnetic flux.

SUMMARY

According to several aspects, an axial flux motor is disclosed. The axial flux motor includes a stator and a rotor disposed about a rotational axis adjacent the stator defining an air gap therebetween. The rotor includes a disk having an interior face oriented toward the stator and an opposite exterior face; a plurality of magnets affixed in a predetermined arrangement on the interior face of the disk; a back plate abutting the exterior face of the disk, wherein the back plate includes a circumferential edge surface defining a plurality of notches; and a segmented cage fitted onto the interior face, wherein the segmented cage includes a plurality of retainer ribs configured to retain the magnets in the predetermined arrangement on the interior face of the disk. The segmented cage cooperates with the back plate to structurally support the disk therebetween, thereby inhibiting the disk from flexing in an axial direction.

In an additional aspect of the present disclosure, the axial flux motor further includes a snap ring locking the segmented cage to the back plate and urging the back plate onto the exterior face of the disk.

In another aspect of the present disclosure, the plurality of retainer ribs includes a retainer rib having an axially extending segment having an end portion inserted through one of the notches.

In another aspect of the present disclosure, the axial flux motor further includes an electrical insulating material disposed between the end portion of the axially extending segment of the retainer rib and the one of the notches.

In another aspect of the present disclosure, the disk includes an interior bore surface facing the rotational axis and an opposite facing exterior circumferential surface. The interior bore surface and exterior circumferential surface interconnect the interior face and the exterior face thus defining an annular disk. The segmented cage includes a central ring having an axially extending circumferential wall facing away from the rotational axis, the circumferential wall is partially inserted into and interference fitted with the interior bore surface.

In another aspect of the present disclosure, the retainer rib includes a radially extending segment extending from an end of the circumferential wall of the central ring to the circumferential surface of the annular disk and transitioning into the axially extending segment.

In another aspect of the present disclosure, the back plate includes a hub partially inserted into the bore surface of the annular disk to provide an interference fit therebetween.

In another aspect of the present disclosure, the back plate includes a plurality of buttress ribs extending radially from an end of the hub converging into an annular ring having the circumferential edge surface defining the plurality of notches.

In another aspect of the present disclosure, the annular disk comprises a spirally coiled silicon steel strip having at least one surface coated with a non-electrical conductive material.

In another aspect of the present disclosure, the axial flux motor further includes a pair of circumferentially extending rib segments projecting in opposite directions perpendicularly from the axially extending segment of the retainer rib.

According to several aspects, an insulated rotor for an axial flux motor is disclosed. The insulated rotor includes an annular disk having a rotational axis, wherein the annular disk includes an interior annular face, an opposite exterior annular face, and a circumferential surface interconnecting the interior annular face and the exterior annular face; a plurality of magnets circumferentially affixed on the interior annular face in a predetermined arrangement; a back plate abutting the exterior annular face of the annular disk, wherein the back plate includes a circumferential edge surface defining a plurality of notches; and a segmented cage fitted over the interior annular face of the annular disk retaining the magnets on the interior annular face, wherein the segment cage includes a plurality of retainer ribs configured to retain the plurality of magnets on the interior annular face.

In an additional aspect of the present disclosure, the retainer ribs include axial extending segments having end portions inserted through the plurality of notches; and a snap ring engaging the end portions thereby locking the back plate and segmented cage onto the annular disk.

In another aspect of the present disclosure, the magnets are equally spaced apart defining plurality of channels between adjacent magnets, and the retainer ribs include radially extending segments aligned with the channels and inserted into the channels abutting the adjacent magnets. The retainer ribs include a width (W2) that is sufficient to abut against the adjacent magnets thus retaining the magnets in the predetermined arrangement.

In another aspect of the present disclosure, the insulated rotor further includes a pair of circumferentially extending rib segments projecting in opposite directions perpendicularly from the axially extending segment. Each of the circumferentially extending rib segments includes a distal end spaced apart from a distal end of an adjacent circumferentially extending rib segment thus defining a gap between adjacent circumferentially extending rib segments.

In another aspect of the present disclosure, the annular disk comprises a spirally coiled silicon steel strip having at least one surface coated with a non-electrical conductive material.

According to several aspects, a non-conductive segmented cage for a rotor of an axial flux motor is disclosed. The non-conductive segmented cage includes a back plate having a circumferential edge surface defining a plurality of notches; a segmented cage having a plurality of retainer ribs corresponding with the plurality of notches, wherein each of the retainer ribs includes a radially extending segment transitioning to an axially extending segment having end portion extending through a corresponding one of the plurality of notches; and a snap ring engaged to the end portions the axially extending segments urging the back plate and the segment cage against the rotor.

In an additional aspect of the present disclosure, the non-conductive segmented cage further includes an electrical insulating material disposed between the end portions of the axially extending segments and the corresponding notches.

In another aspect of the present disclosure, the back plate includes a hub; and a plurality of buttress ribs extending radially from an end of the hub converging into an annular ring having the circumferential edge surface.

In another aspect of the present disclosure, each of the axially extending segments includes a pair of circumferentially extending rib segments projecting in opposite directions perpendicularly from each of the axially extending segment.

In another aspect of the present disclosure, the segmented cage includes a central ring, wherein the radially extending segments extends from the central ring Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is an exploded perspective view of one of the two rotors of FIG. 2, according to an exemplary embodiment;

FIG. 4 is a diagrammatic side view of a partially completed laminated disk of the rotor of FIG. 3, according to an exemplary embodiment; and FIG. 4A is a diagrammatic detailed view of a coated metallic strip forming a laminated annular, according to an exemplary embodiment.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
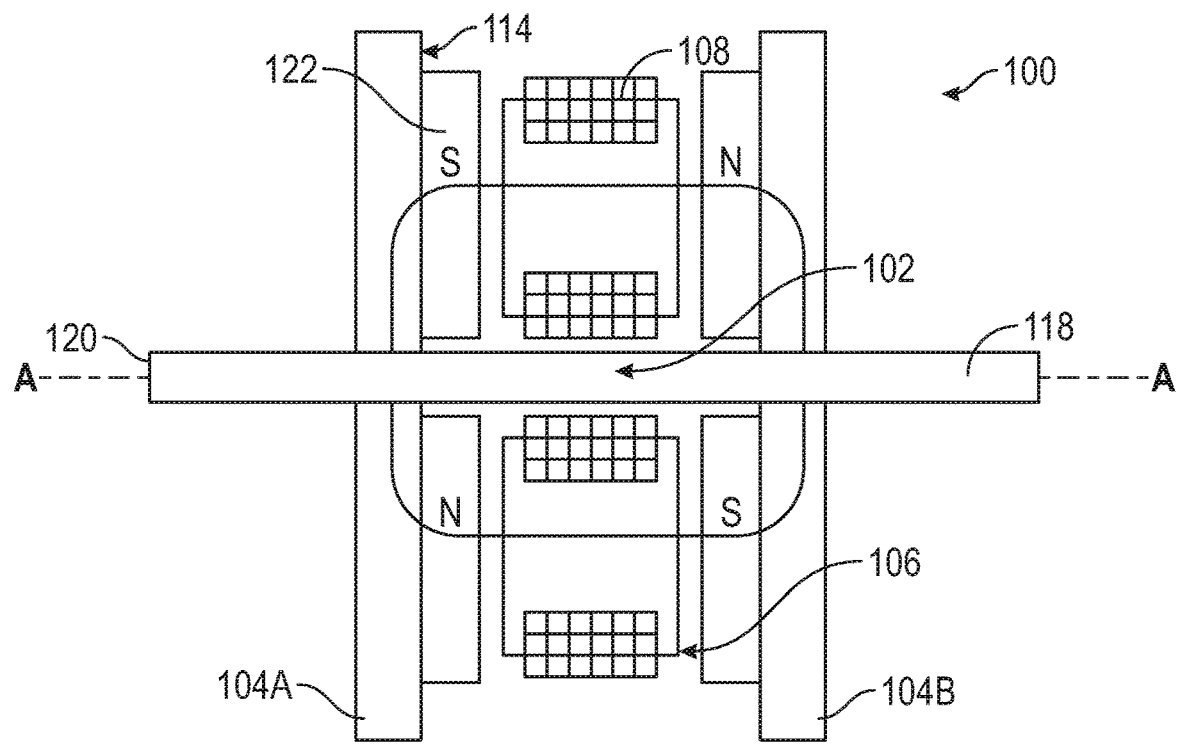
FIG. 1 is a schematic illustration of an axial flux motor having a stator stacked between two external rotors, according to an exemplary embodiment.
Figure 2:
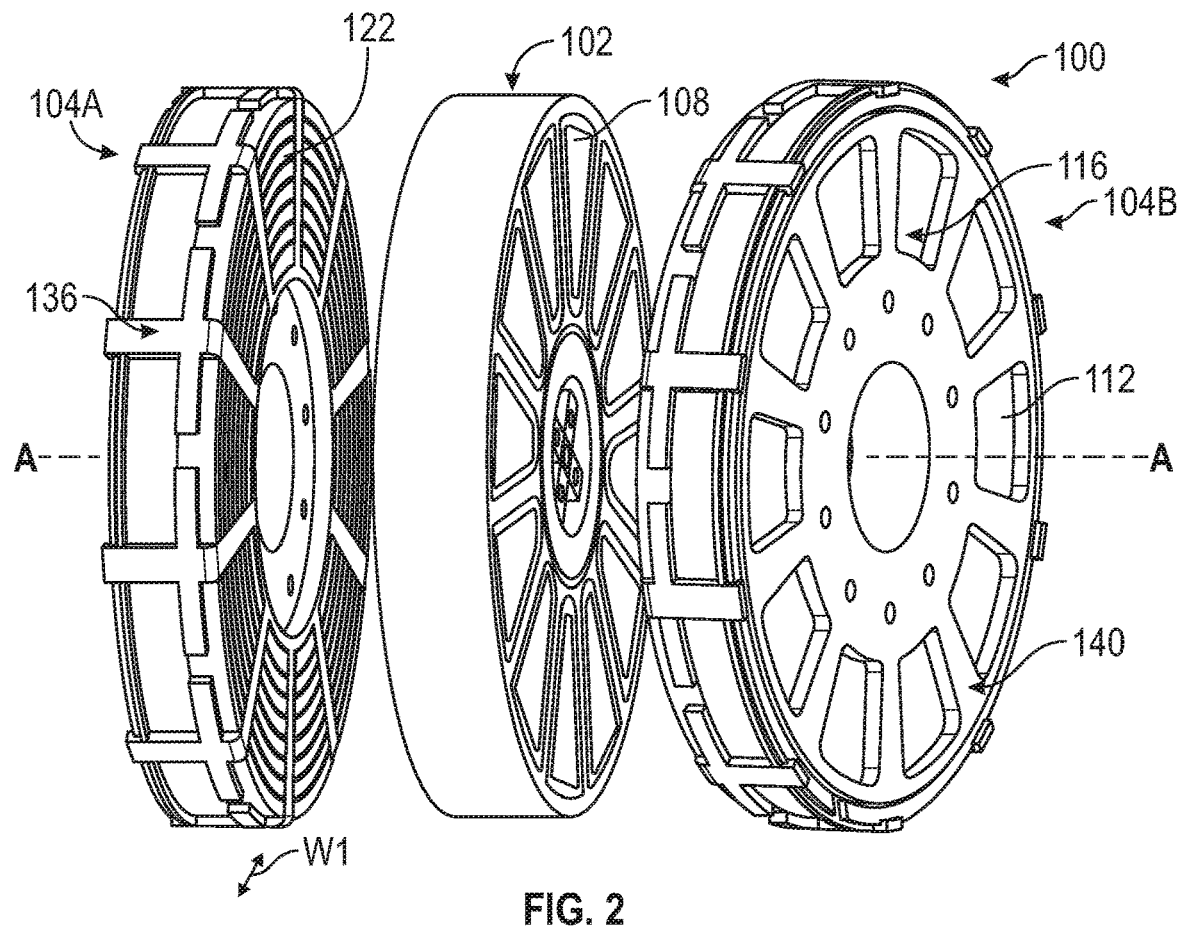
FIG. 2 is an exploded partial perspective view of an axial flux motor showing a stator stacked between two external rotors, according to an exemplary embodiment.

Referring to FIG. 1, a schematic illustration of an axial flux motor 100, also known as a pancake motors 100, having dual external rotors 104A, 104B. FIG. 2 is an exploded diagrammatic illustration of the axial flux motor 100 of FIG. 1. In the embodiment shown, the axial flux motor 100 includes a stator 102 stacked between a first rotor 104A and a second rotor 104B along an axis-A. The rotors 104A, 104B are separated from the stator 102 by a small air gap 106 and rotates relative to the fixed stator 102. It should be appreciated that while two rotors 104A, 104B are depicted, it is not intended for the axial flux motor 100 to be limited as such. It should be appreciated that axial flux motors may have one rotor and one stator, one rotor and two stators, and various combinations of multiple rotors and stators.

Referring to both FIG. 1 and FIG. 2, the stator 102 includes a plurality of electrically conductive windings 108 and each of the rotors 104A, 104B includes a laminated annular disk 112 having an interior annular face 114 oriented toward the stator 102 and an opposite exterior annular face 116. An output shaft 118 is rotationally coupled to each of the rotor such that the rotation of the rotors cause the output shaft 118 to rotate. The output shaft 118 includes opposite output shaft ends 120. The stator 102 and rotors 104A, 104B may be enclosed in a housing (not shown) with the output shaft ends 120 extending through shaft openings defined in the housing. The stator 102 may be rotationally grounded to the housing and output shaft 118 may be supported by bearings that align the rotors with respect to the stator 102 while allowing rotation of the output shaft 118.

The plurality of electrically conductive windings 108 of the stator 102 may be formed of copper wires operable to interact with the magnetic fields of a plurality permanent magnets 122 having alternating poles located on the rotors. Different regions of the stator 102 may be selectively energized to impart a rotational force on the rotors 104A, 104B causing the rotors 104A, 104B and the rotationally coupled shaft 118 to spin on the rotational axis A. The axial flux motor 100 having a single stator 102 and two rotors 104A, 104B may be used in high torque applications such as for the propulsion of an electric or hybrid vehicle. The housing may be fixed to the vehicle frame and at least one output shaft end 120 is coupled to a reduction gear box or directly to the vehicle drive wheels. The vehicle applications of the axial flux motor 100 is provided as an exemplary embodiment and is not intended to be limiting.

Referring to FIG. 2, first rotor 104A and the second rotor 104B are substantially similar, thus it is understood that the following descriptive disclosure of an exemplary rotor 104 having a non-conductive segmented cage 136, also referred to as an insulated rotor 104, applies to both the first rotor 104A and the second rotor 104B. FIG. 3 shows an exploded view of the insulated rotor 104 having the laminated annular disk 112. The annular disk includes an interior bore surface 124 facing the axis-A and an opposite facing exterior circumferential surface 126. The bore surface 124 and the exterior circumferential surface 126 interconnect the interior annular face 114 and the exterior annular face 116. The interior annular face 114 and the exterior annular face 116 are shown perpendicular to the axis-A.

FIG. 4 shows a diagrammatic side view of a partially completed laminated annular disk 112, the features of which are exaggerated to show details. The laminated annular disk 112 is formed of a metallic strip 128, preferably a silicon steel strip, having a thickness of approximately less than 0.3 mm thick and a predetermined width (W1). The predetermined width (W1) is the width of the circumferential surface 126 along the axis-A. The metallic strip 128 is stacked by spirally coiling the metallic strip 128 to form the laminated annular disk 112. Referring to FIG. 4A, the metallic strip 128 includes at least one metallic strip surface 130 that is coated with a non-electrical conductive material 132 to increase electrical resistant between the layers of laminations to reduce eddy currents and to provide resistance to corrosion or rust. The non-electrical conductive material 132 may be that of a C5A or C6 insulation class in accordance with AISI-ASTM A 976-9 standards.

In an alternative embodiment, the disk may be manufactured of a non-conductive material such as a soft magnetic composite (SMC), which is a mixed powder having electrical insulating property, that is pressed in a die to form an annular disk shape or any other shapes depending on the forming die.

Referring back to FIG. 3, the plurality of permanent magnets 122 are equally circumferentially positioned onto the interior annular face 114 and affixed in position with a bonding adhesive. Each permanent magnet 122 is spaced apart from an adjacent permanent magnet 122 defining a channel 134 therebetween. In the embodiment shown, the channels 134 are shown extending radially from the bore surface 124 to the circumferential surface 126 of the annular disk 112 to generate multiple magnetic poles in the circumferential. In an alternative embodiment, additional channels 135 may be added extending circumferentially on the interior face concentric with the bore surface 124 to segment each magnet pole to further reduce the core loss in the magnets. The rotor 104 includes a non-conductive segmented cage 136 to maintain the permanent magnets 122 in a predetermined arrangement and to reinforce the structural integrity of the laminated annular disk 112.

The non-conductive segmented cage 136 includes a back plate 138 abutting the exterior annular face 116 of the annular disk 112, a segmented cage 140 fitted on the interior annular face 114 between the channels 134, and a snap ring 142 locking the back plate 138 and segmented cage 140 onto the laminated annular disk 112. The back plate 138 cooperates with the segmented cage 140 to structurally support the annular disk 112 therebetween, thereby inhibiting the laminated annual disk 112 from flexing or bending in the axial direction and delaminating in the radial direction. The back plate 138 also cooperates with the segmented cage 140 to retain the magnets 122 in a fixed position on the interior face of the annular disk 112. The back plate 138 and segmented cage 140 may be formed from steel, aluminum, and/or a composite material such as carbon fiber.

The back plate 138 includes a hub 144 partially inserted into the bore surface 124 of the laminated annular disk 112 to provide an interference fit therebetween. In the embodiment shown, the hub 144 includes a cylindrical surface 146 extending along the axis-A. The cylindrical surface 146 includes a first end 148 having an annular end surface 150 perpendicular to the axis-A and an opposite second end 152. A plurality of equally spaced buttress ribs 154 extends radially from the second end 152 of the cylindrical surface 146 and converging into an annular ring 156. The annular ring 156 includes a circumferential edge surface 158 defining a plurality of notches 160.

The segmented cage 140 includes a central ring 162 having an axially extending circumferential wall 164 facing away from the axis A. The circumferential wall 164 is partially inserted into and interference fitted with the bore surface 124 of the annular disk 112. The circumferential wall 164 includes a first end 166 and an opposite second end 168. A plurality of equally spaced retainer ribs 170 having a radially extending segment 172 extends radially from second end 168 of the circumferential wall 164 of the central ring 162 to the circumferential surface 126 of the rotor 104 and transitioning into an axially extending segment 174 extending axially toward and beyond the back plate 138. The number of equally spaced retainer ribs 170 are equivalent to the number of equally spaced notches 160, which are equal to the number of channels 134 between pairs of adjacent permanent magnets 122. The retainer ribs 170 include a width (W2) that is sufficient to abut against the adjacent pairs of permanent magnets 122 when inserted into the corresponding channels 134.

The retainer ribs 170 also include a pair of circumferentially extending rib segments 176 projecting in opposite directions perpendicularly from the axially extending segment 174. Each circumferentially extending rib segments 176 includes a distal end 178 which is spaced from the distal end 178 of an adjacent circumferentially extending rib segment 176 thus defining a gap 180 between circumferentially extending rib segments 176.

The axial extending segments 174 of the retainer ribs 170 are aligned with the notches 160 such that an end portion 182 of an axially extending segment 174 is inserted through one of a plurality of notches 160 defined on the circumferential edge surface 158 of the back plate 138. The axially extending segment includes a snap ring slot 184. Once assembled, the snap ring 142 is compressed and released into the snap ring slots 184. The snap ring urges the back plate 138 against the exterior annular face 116 and the segmented cage 140 against the internal annular face 114 thereby compressing and structural supporting the annular disk 112 therebetween. An electrical insulating material 188, such as electrical insulation papers, resins, glass, etc., may be applied at the mating interface between the notches 160 and axially extending segments 174.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An axial flux motor comprising:
a stator;
a rotor disposed about a rotational axis adjacent the stator defining an air gap therebetween, wherein the rotor comprises:
a disk having an interior face oriented toward the stator and an opposite exterior face;
a plurality of magnets affixed in a predetermined arrangement on the interior face of the disk;
a back plate abutting the exterior face of the disk, wherein the back plate includes a circumferential edge surface defining a plurality of notches; and
a segmented cage fitted onto the interior face, wherein the segmented cage includes a plurality of retainer ribs configured to retain the magnets in the predetermined arrangement on the interior face of the disk;
wherein the segmented cage cooperates with the back plate to structurally support the disk therebetween, thereby inhibiting the disk from flexing in an axial direction.

2. The axial flux motor of claim 1, further comprising a snap ring locking the segmented cage to the back plate and urging the back plate onto the exterior face of the disk.

3. The axial flux motor of claim 2, wherein the plurality of retainer ribs includes a retainer rib having an axially extending segment having an end portion inserted through one of the notches.

4. The axial flux motor of claim 3, further including an electrical insulating material disposed between the end portion of the axially extending segment of the retainer rib and the one of the notches.

5. The axial flux motor of claim 3, wherein:
the disk includes an interior bore surface facing the rotational axis and an opposite facing exterior circumferential surface, wherein the interior bore surface and exterior circumferential surface interconnect the interior face and the exterior face thus defining an annular disk; and
the segmented cage includes a central ring having an axially extending circumferential wall facing away from the rotational axis, the circumferential wall is partially inserted into and interference fitted with the interior bore surface.

6. The axial flux motor of claim 5, wherein the retainer rib includes a radially extending segment extending from an end of the circumferential wall of the central ring to the circumferential surface of the annular disk and transitioning into the axially extending segment.

7. The axial flux motor of claim 5, wherein the back plate includes a hub partially inserted into the bore surface of the annular disk to provide an interference fit therebetween.

8. The axial flux motor of claim 7, wherein the back plate includes a plurality of buttress ribs extending radially from an end of the hub converging into an annular ring having the circumferential edge surface defining the plurality of notches.

9. The axial flux motor of claim 5, wherein the annular disk comprises a spirally coiled silicon steel strip having at least one surface coated with a non-electrical conductive material.

10. The axial flux motor of claim 3, further including a pair of circumferentially extending rib segments projecting in opposite directions perpendicularly from the axially extending segment of the retainer rib.

11. An insulated rotor for an axial flux motor comprising:
an annular disk having a rotational axis, wherein the annular disk includes an interior annular face, an opposite exterior annular face, and a circumferential surface interconnecting the interior annular face and the exterior annular face;
a plurality of magnets circumferentially affixed on the interior annular face in a predetermined arrangement;
a back plate abutting the exterior annular face of the annular disk, wherein the back plate includes a circumferential edge surface defining a plurality of notches; and
a segmented cage fitted over the interior annular face of the annular disk retaining the magnets on the interior annular face, wherein the segment cage includes a plurality of retainer ribs configured to retain the plurality of magnets on the interior annular face.

12. The insulated rotor of claim 11, wherein:
the retainer ribs include axial extending segments having end portions inserted through the plurality of notches; and
a snap ring engaging the end portions thereby locking the back plate and segmented cage onto the annular disk.

13. The insulated rotor of claim 12, wherein:
the magnets are equally spaced apart defining plurality of channels between adjacent magnets, and
the retainer ribs include radially extending segments aligned with the channels and inserted into the channels abutting the adjacent magnets,
wherein the retainer ribs include a width (W2) that is sufficient to abut against the adjacent magnets thus retaining the magnets in the predetermined arrangement.

14. The insulated rotor of claim 13, further comprising a pair of circumferentially extending rib segments projecting in opposite directions perpendicularly from the axially extending segment, wherein each of the circumferentially extending rib segments includes a distal end spaced apart from a distal end of an adjacent circumferentially extending rib segment thus defining a gap between adjacent circumferentially extending rib segments.

15. The insulated rotor of claim 14, wherein the annular disk comprises a spirally coiled silicon steel strip having at least one surface coated with a non-electrical conductive material.

16. A non-conductive segmented cage for a rotor of an axial flux motor comprising:
a back plate having a circumferential edge surface defining a plurality of notches;
a segmented cage having a plurality of retainer ribs corresponding with the plurality of notches, wherein each of the retainer ribs includes a radially extending segment transitioning to an axially extending segment having end portion extending through a corresponding one of the plurality of notches; and
a snap ring engaged to the end portions the axially extending segments urging the back plate and the segment cage against the rotor.

17. The non-conductive segmented cage of claim 16, further comprising an electrical insulating material disposed between the end portions of the axially extending segments and the corresponding notches.

18. The non-conductive segmented cage of claim 17, wherein the back plate includes:
a hub; and a plurality of buttress ribs extending radially from an end of the hub converging into an annular ring having the circumferential edge surface.

19. The non-conductive segmented cage of claim 18, wherein each of the axially extending segments includes a pair of circumferentially extending rib segments projecting in opposite directions perpendicularly from each of the axially extending segment.

20. The non-conductive segmented cage of claim 19, wherein the segmented cage includes a central ring, wherein the radially extending segments extends from the central ring.

* * * * *